July 3, 1962
R. A. NAVARRO
3,042,891
BATTERY TERMINALS
Filed Oct. 29, 1959
2 Sheets-Sheet 1
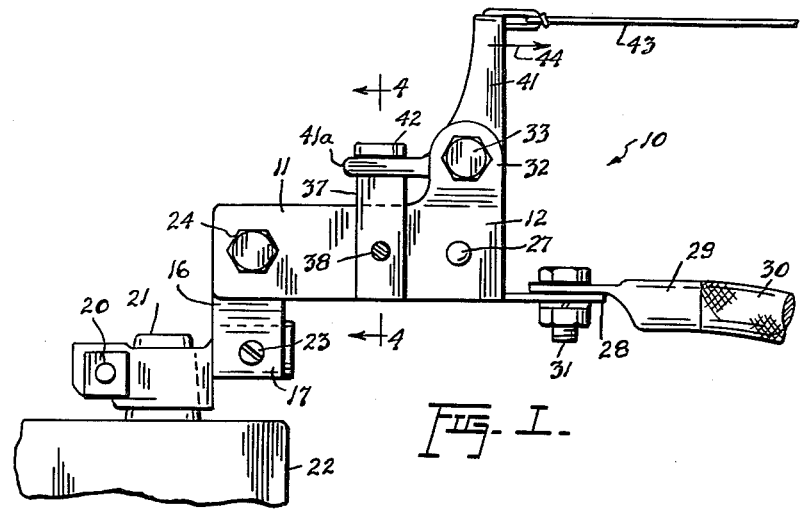
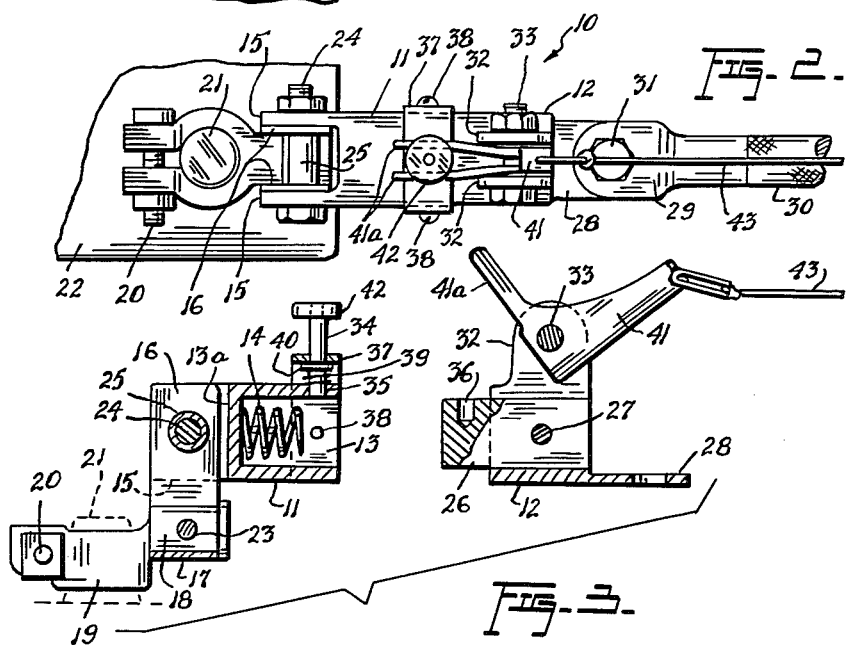
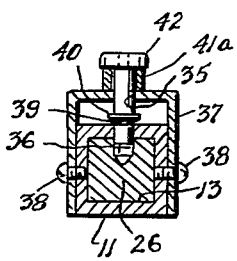
Inventor:
Richard A. Navarro July 3, 1962 R. A. NAVARRO 3,042,891
BATTERY TERMINALS
Filed Oct. 29, 1959 2 Sheets-Sheet 2
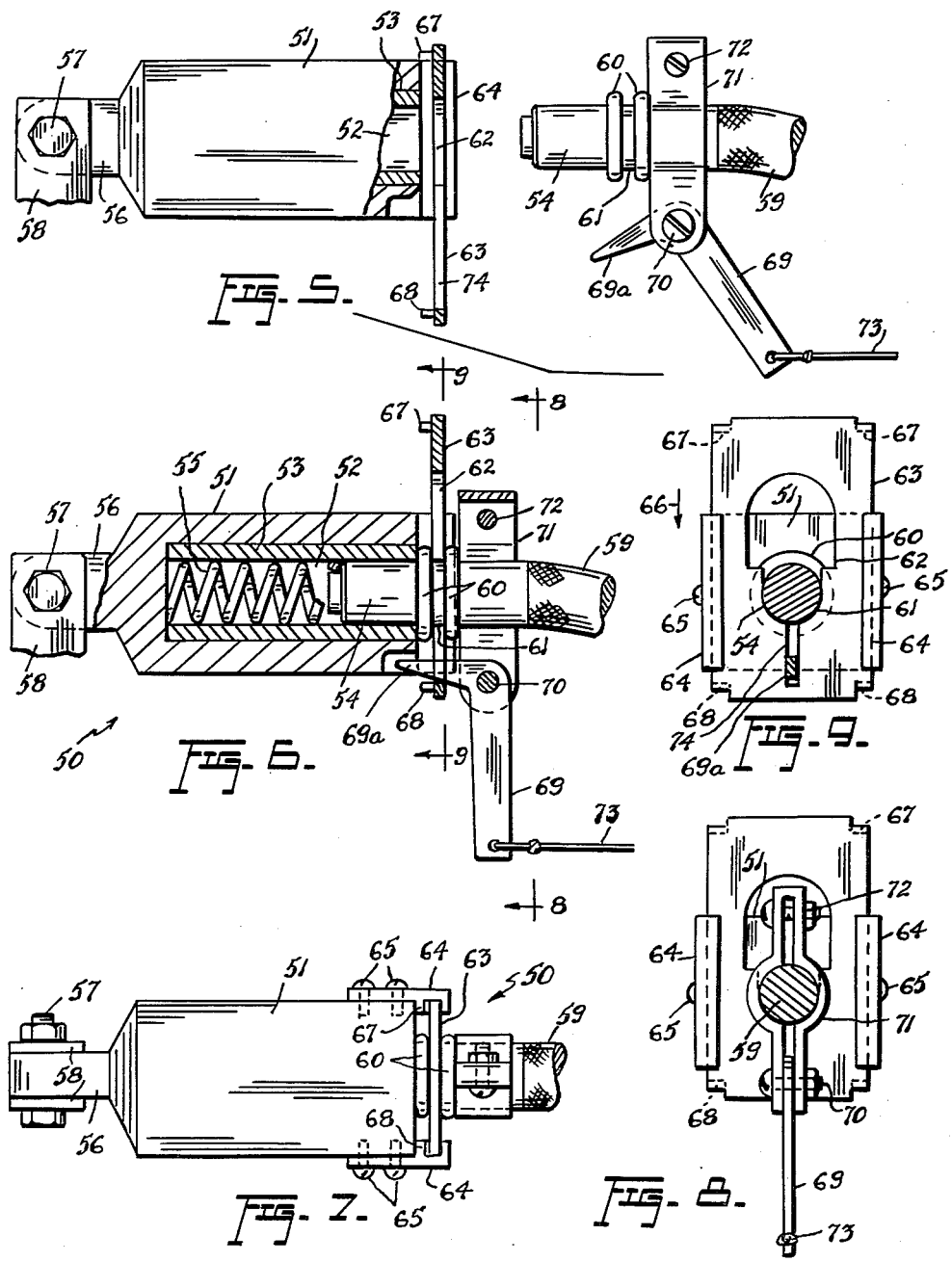
Inventor
Richard A. Navarro United States Patent Office 3,042,891
Patented July 3, 1962

3,042,891
BATTERY TERMINALS
Richard A. Navarro, 906 Walton St., Houston 9, Tex.
Filed Oct. 29, 1959, Ser. No. 849,490
5 Claims. (Cl. 339—45)

This invention relates to new and useful improvements in battery post terminals of the general type used in the automotive industry, and the principal object of the invention is to prevent losses of life and injuries which are very frequently sustained by occupants of an automobile as a result of fire or explosion when the automobile is involved in an accident or wreck and the occupants are trapped therein.

Under such conditions a broken fuel line or a leaking gasoline tank splashes highly inflammable fuel over and around the vehicle, and a spark produced by a broken live wire or rubbing of metal is more than sufficient to set the gasoline on fire or cause a violent explosion. Also, a wild running motor may become so hot as to produce an open flame, with the same results.

Accordingly, the principal object of the invention is attained by the provision of an improved battery terminal whereby a conductor cable may be quickly and easily disconnected from the battery in the event of an emergency, thus completely de-energizing the entire electrical system of the vehicle and stopping its engine, so that even in the presence of spilled fuel, the electrical system or the engine cannot produce sparks to set the fuel on fire.

Similarly, another important object of the invention is to minimize accidents caused by an inability of the driver to keep control of the automobile for any particular reason, in which event a quick and easy disconnection of the battery terminal will render the ignition system of the engine inoperative and the automobile will be brought to a stop by the braking action of the engine.

Another important feature of the invention is to prevent automobile fires resulting from short-circuited wiring, in which event the quick and easy disconnection of the battery terminal will instantly de-energize the entire wiring system.

The battery post terminal in accordance with the invention includes a portion which is adapted for connection to the battery post and another portion which is adapted to have a conductor cable connected thereto, an important feature of the invention residing in the provision of quickly and easily separable means for connecting the two terminal portions together and facilitating their separation without the use of any tools whatsoever.

Another important feature of the invention resides in the provision of remotely controlled means for effecting the separation of the two terminal portions, such means, for example, being operable from the interior of the automobile so that in the event of an emergency, the operator may easily disconnect the cable from the battery without the necessity of leaving his seat and opening the engine compartment.

Another important feature of the invention resides in the provision of resilient means for quickly separating the terminal portions upon actuation of the releasing means, while a further important feature resides in a particular structural arrangement of parts whereby the working or movable components of the invention are located distantly from the battery post and thus are not materially subjected to corrosion or other damage due to acidity.

Some of the advantages of the invention reside in its simplicity of construction, convenient and dependable operation, and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of a terminal in accordance with the invention, operatively connecting a conductor cable to a batery;

FIGURE 2 is a top plan view thereof;

FIGURE 3 is a side elevational view, similar to that shown in FIGURE 1 but partly in section and showing the parts of the terminal separated;

FIGURE 4 is a cross-sectional detail, taken substantially in the plane of the line 4—4 in FIGURE 1;

FIGURE 5 is a side elevational view, partly in section, showing a modified embodiment of the invention with the parts thereof separated;

FIGURE 6 is a longitudinal sectional view of the embodiment of FIGURE 5 with the parts thereof connected together;

FIGURE 7 is a top plan view of the subject shown in FIGURE 6;

FIGURE 8 is a sectional view, taken substantially in the plane of the line 8—8 in FIGURE 6; and FIGURE 9 is a sectional view, taken substantially in the plane of the line 9—9 in FIGURE 6.

Referring now to the accompanying drawings in detail, particularly to the embodiment of the invention shown in FIGURES 1-4 inclusive, the battery terminal is designated generally by the reference numeral 10 and comprises a somewhat elongated body consisting, as is best shown in FIGURE 3, of two complemental sections 11 and 12. The body section 11 is provided with a socket 13 having a closed inner end 13a to which is suitably anchored one end of a compression spring 14, disposed within the socket. The section 11 is also equipped with a pair of spaced, apertured ears 15 which straddle a pair of similarly apertured ears 16 constituted by the end portions of a U-shaped clamp 17. The bight portion of the latter embraces a cylindrical shank 18 of a conventional battery terminal 19 which is clamped by a bolt and nut assembly 20 to a post 21 of a batery 22 in the usual manner. In conventional practice the shank 18 of the terminal is formed with a socket for reception of a conductor cable, which practice is not followed in connection with this invention. If desired, the clamp 17 may be secured to the shank 18 by a transverse bolt 23, or may be soldered or otherwise fastened thereto. A nut-equipped bolt 24 extends through the apertured ears 15, 16 for securing the body section 11 to the clamp 17, and a tubular spacer 25 is provided on the bolt 24 between the ears 16 to prevent the same from collapsing when the bolt is tightened.

The second body section 12 is in the form of a U-shaped member which accommodates in its bight portion a plug member 26, secured in position by a transverse pin 27. The plug member projects outwardly from the section 12 and is of a size which permits it to be slidably received in the socket 13 of the section 11. The section 12 also includes an apertured lug 28 for connection to the terminal element 29 of a conductor cable 30 by a suitable bolt 31, and the upper end portions of the section 12 provide a pair of spaced, apertured ears 32 having a transverse bolt 33 extending therethrough for a purpose hereinafter to be described.

Means are provided for releasably retaining the plug member 26 of the body section 12 in the socket 13 of the section 11 against the resiliency of the spring 14 which becomes compressed when the plug member is inserted in the socket. These means consist of a latch pin 34 extending through an aperture 35 in the top of the section 11 into a blind bore 36 formed in the plug member 26, as is best shown in FIGURE 4. The latch pin 34 also passes through an apertured bight portion of an inverted U-shaped bearing bracket 37 which straddles the body section 11 and is secured to the sides of the latter by suitable screws 38. A compression spring 39 is provided on the pin 34 between the top of the section 11 and a shoulder 40 with which the pin is also equipped, thus urging the pin upwardly to a position where it is retracted from the bore 36 of the plug member 26. However, it should be understood that the pressure exerted by the spring 14 against the plug member 26 produces such friction between the wall of the bore 36 and the pin 34 that the resiliency of the spring 39 is insufficient to retract the pin 34 when the parts are assembled. Means presently to be described are employed for retracting the pin 34, the primary purpose of the spring 39 being to hold the pin retracted when the body sections 11 and 12 are separated as shown in FIGURE 3, whereby to facilitate insertion of the plug member 26 into the socket 13 without interference with the pin. Once the plug member is inserted in the socket, the pin 34 is manually pressed inwardly into the bore 36 to hold the parts in their assembled relation.

The aforementioned means for retracting the pin comprise a bell crank 41 which is pivotally mounted on the aforementioned bolt 33 between the ears 32 of the body section 12 and has a forked arm 41a which straddles the pin 34 and engages the underside of a head 42 with which the pin is equipped. The other arm of the crank 41 has suitably connected thereto one end of an actuating line 43 which may or may not be flexible, the line 43 extending to a remote point, such as for example, the instrument panel of the vehicle on which the invention is used, at which point the line is provided with a suitable pull knob, or the like (not shown), whereby a pulling force may be conveniently exerted on the line as indicated by the arrow 44.

With the parts assembled as shown in FIGURES 1 and 2, current may flow from the battery post 21 through the terminal 10 and the cable 30 in the usual manner. However, in the event of a short circuit in the wiring associated with the cable 30, the battery may be quickly and easily disconnected from the cable by simply pulling the line 43, which causes the crank 41 to retract the latch pin 34 and facilitates instant ejection of the plug member 26 from the socket 13 by the spring 14. Thus, the parts become separated as illustrated in FIGURE 3 to interrupt the flow of current.

The modified form of the invention shown in FIGURES 5–9 inclusive and designated generally by the reference numeral 50 is the same in function and somewhat similar in structure to the embodiment 10. In this modified form the terminal comprises a body portion 51 provided with a socket 52 having a tubular liner or bushing 53 therein, the bushing slidably receiving a plug member 54 which is urged outwardly from the socket by a spring 55, as will be clearly apparent. The body 51 is provided with an apertured lug 56 secured by a bolt 57 between a pair of apertured ears 58, corresponding to the ears 16 in the assembly 10.

The plug member 54 is provided in the form of a terminal element on the cable 59 and is formed integrally with a pair of spaced annular shoulders 60 having a land portion 61 therebetween which is receivable in a U-shaped, relatively small region of a recess 62 formed in a latch plate 63. The upper portion or region of the recess 62 is of an inverted U-shaped form and somewhat larger than the lower region, so as to facilitate passage of the shoulders 60 therethrough. The plate 63 is slidable vertically in a pair of track-forming brackets 64 which are secured to opposite sides of the body 51 by suitable screws 65. It will be apparent from the foregoing that when the latch plate 63 is in its upwardly slid position as best shown in FIGURE 9, the disposition of the land portion 61 within the small lower region of the recess 62 and the resultant disposition of the shoulders 60 inwardly and outwardly of the plate 63 will result in retaining of the plug member 54 in the socket 52 against the resiliency of the spring 55.

However, if the plate 63 is slid downwardly as indicated by the arrow 66, passage of the shoulders 60 through the relatively large upper region of the recess 62 will permit the spring 55 to eject the plug member 54 from the socket 52, thus separating the cable 59 from the battery to which the terminal is applied.

In order to prevent the plate 63 from sliding completely out of the track-forming brackets 64, the upper and lower edge portions of the plate are provided with angulated detents 67, 68, respectively. These detents are selectively engageable with the brackets 64 at the respective lower and upper limits of travel of the sliding plate and thus prevent the plate from being completely withdrawn.

The downward sliding movement of the latch plate 63 for releasing the plug member 54 from the socket 52 is effected by a bell crank 69 which is pivotally mounted on a bolt 70 in a clamp 71. The latter, in turn, is secured to the plug member 54 between the cable 59 and the shoulders 60, as by a clamping screw 72. The crank 69 includes a relatively long arm having a pull line 73 connected thereto, and a relatively short arm 69a which is operatively disposed in a notch 74 extending downwardly from the recess 62 in the plate 63. Accordingly, when the line 73 is pulled, the plate 63 is slid downwardly by the bell crank 69 to facilitate separation of the parts of the terminal, as already described.

While in the foregoing there have been described and shown the preferred embodiments of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A quickly separable battery post terminal, comprising in combination a terminal body consisting of first and second complemental body sections, the first body section being adapted to be mounted upon a battery post and being provided with a cylindrical socket having a closed inner end and an open outer end, said second body section having a cylindrical plug slidably and removably disposed in said socket, a compression spring provided in said socket between the closed inner end of the latter and said plug for urging the plug outwardly from the socket, a latch member slidably mounted on said first body section for sliding movement in a plane perpendicular to the axis of said socket, said plug being provided with a recess slidably receiving said latch member whereby to retain the plug in the socket against the action of said spring, an actuating element pivotally mounted on said second body section and operatively connected to said latch member for sliding the latter out of its plug retaining position in the recess of said plug whereby the plug may be ejected from said socket by said spring, and remotely controlled means connected to said actuating element for operating the same.

2. The device as defined in claim 1 wherein said actuating element comprises a bell crank pivoted to said second body section for swinging movement in a plane parallel to the axis of said socket, one arm of said bell crank being operatively connected to said latch element and the other arm of the crank having said remotely controlled means connected thereto.

3. The device as defined in claim 1 wherein said first body section is provided with a lateral bore communicating with said socket, the recess of said plug being registrable with said lateral bore, and said latch member comprising a pin slidable in said lateral bore in and out of said recess of the plug, said actuating element being operatively connected to said pin.

4. The device as defined in claim 3 together with resilient means slidably biasing said pin out of the recess in said plug.

5. The device as defined in claim 1 wherein said latch member comprises a plate provided with an opening having a restricted portion to accommodate said plug and retain the plug in said socket and an enlarged portion for permitting the plug to be ejected from the socket, and channel-like guides provided on said first body section and slidably receiving said plate, said actuating element being operatively connected to the plate for sliding the same whereby to selectively place the restricted and enlarged portions of said opening in alignment with said plug.

References Cited in the file of this patent

UNITED STATES PATENTS

| | | |
|---|---|---|
| 1,323,077 | Lorquet | Nov. 25, 1919 |
| 1,663,013 | Logan | Mar. 20, 1928 |
| 1,940,666 | Diamond | Dec. 26, 1933 |
| 2,477,895 | Pollock | Aug. 2, 1949 |
| 2,524,701 | Grill | Oct. 3, 1950 |
| 2,533,763 | Cacciotti | Dec. 12, 1950 |
| 2,658,182 | Jackson et al. | Nov. 3, 1953 |
| 2,706,284 | Hoggatt et al. | Apr. 12, 1955 |
| 2,710,384 | Dupre et al. | June 7, 1955 |
| 2,722,575 | Dobkins | Nov. 1, 1955 |
| 2,878,460 | Coleman | Mar. 17, 1959 |
| 2,898,448 | Smith | Aug. 4, 1959 |